US010836904B2

(12) United States Patent
Osborn et al.

(10) Patent No.: US 10,836,904 B2
(45) Date of Patent: Nov. 17, 2020

(54) LOW-HALOGEN FLAME RETARDANT POLYAMIDE COMPOSITIONS RESISTANT TO HEAT AGING

(71) Applicant: Ascend Performance Materials Operations LLC, Houston, TX (US)

(72) Inventors: Shawn J. Osborn, Pace, FL (US); Christopher M. Carter, Pensacola, FL (US)

(73) Assignee: Ascend Performance Materials Operations LLC, Houston, TX (US)

( * ) Notice: Subject to any disclaimer, the term of this patent is extended or adjusted under 35 U.S.C. 154(b) by 0 days.

(21) Appl. No.: 16/078,703

(22) PCT Filed: Oct. 17, 2017

(86) PCT No.: PCT/US2017/056853
§ 371 (c)(1),
(2) Date: Aug. 22, 2018

(87) PCT Pub. No.: WO2018/075431
PCT Pub. Date: Apr. 26, 2018

(65) Prior Publication Data

US 2019/0233642 A1 Aug. 1, 2019

Related U.S. Application Data

(60) Provisional application No. 62/409,699, filed on Oct. 18, 2016.

(51) Int. Cl.

| | |
|---|---|
| ***C08L 77/06*** | (2006.01) |
| ***C08K 3/16*** | (2006.01) |
| ***C08K 5/00*** | (2006.01) |
| ***C08K 5/3492*** | (2006.01) |
| ***C08K 5/49*** | (2006.01) |
| ***C08L 77/10*** | (2006.01) |
| ***C09K 21/10*** | (2006.01) |
| ***C09K 21/12*** | (2006.01) |
| ***C08K 3/04*** | (2006.01) |
| ***C08K 5/098*** | (2006.01) |

(52) U.S. Cl.
CPC ................ *C08L 77/06* (2013.01); *C08K 3/04* (2013.01); *C08K 3/16* (2013.01); *C08K 5/0066* (2013.01); *C08K 5/0091* (2013.01); *C08K 5/098* (2013.01); *C08K 5/34924* (2013.01); *C08K 5/34928* (2013.01); *C08K 5/49* (2013.01); *C08L 77/10* (2013.01); *C09K 21/10* (2013.01); *C09K 21/12* (2013.01); *C08L 2201/02* (2013.01)

(58) Field of Classification Search
None
See application file for complete search history.

(56) References Cited

U.S. PATENT DOCUMENTS

| | | | | |
|---|---|---|---|---|
| 3,428,597 | A | 2/1969 | Dikotter et al. | |
| 8,450,407 | B2 | 5/2013 | Prusty et al. | |
| 2013/0324646 | A1 | 12/2013 | De Campo et al. | |
| 2014/0336317 | A1 | 11/2014 | Huang et al. | |
| 2016/0053115 | A1* | 2/2016 | Roth ...................... | C08L 77/00 524/133 |

FOREIGN PATENT DOCUMENTS

| | | | |
|---|---|---|---|
| CA | 2347258 | C | 4/2006 |
| JP | 2003-292774 | A | 10/2003 |

OTHER PUBLICATIONS

International Search Report issued in corresponding International Patent Application No. PCT/US2017/056853 dated Dec. 14, 2017.
European Application No. EP17862172.8, Office Action, dated Sep. 15, 2020, 5 pages.

* cited by examiner

*Primary Examiner* — Robert T Butcher
(74) *Attorney, Agent, or Firm* — Kilpatrick Townsend & Stockton LLP

(57) ABSTRACT

The present invention relates to a low-halogen flame retardant thermoplastic polyamide composition that provides improved mechanical and electrical stability at elevated temperatures, where the thermoplastic composition comprises a polyamide resin; a non-halogen, nitrogen-containing flame retardant; a heat stabilizer containing a copper halide and an organophosphorus compound; an optional lubricant and/or mold release agent; and an optional colorant.

23 Claims, No Drawings

LOW-HALOGEN FLAME RETARDANT POLYAMIDE COMPOSITIONS RESISTANT TO HEAT AGING

BACKGROUND OF THE INVENTION

Polyamide resins are desirable for use in many applications due to their high melting points, high recrystallization temperatures (i.e., faster injection molding cycle times), high flow, toughness, elasticity, chemical resistance, inherent UL94 V2 flame retardancy and abrasion resistance. These chemical and mechanical properties make polyamides ideal for use in such diverse applications as cable ties, sports equipment, window thermal breaks, aerosol valves, food film packaging, automotive/vehicle parts (e.g., radiator end-tanks, charge air coolers, fans and shrouds, push/pull cables), industrial fibers (e.g., airbags, tire cords) and electrical/electronic parts (e.g., connectors, terminal blocks, battery seals, photovoltaics, LEDs, circuit breakers).

Historically, halogen-based flame retardants have been primarily added to thermoplastic compositions to achieve desired flame retardancy ratings where the flame retardants were predominantly either chlorine-based or bromine-based. The flame retardant acts in the solid, liquid or gas phase chemically (e.g., by liberation of nitrogen gas) and/or mechanically (e.g., by producing a foam). Flame retardants typically interfere with a specific stage of the combustion process, such as during heating, decomposition, ignition or flame spread.

Examples of conventional chlorine-based flame retardants include chlorinated paraffins, chlorinated polyethylenes, dodecachloropentacyclooctadeca-7,15-diene (Dechlorane Plus® 25) and HET anhydride. Examples of conventional bromine-based flame retardants include hexabromocyclododecane (HBCD), decabromodiphenyl oxide (DBDPO), octabromodiphenyl oxide, tetrabromobisphenol A (TBBA), bis(tribromophenoxy)ethane, bis(pentabromophenoxy)ethane (BPBPE), tetrabromobisphenol A epoxy resins (TBBA epoxy), tetrabromobisphenol A carbonates (TBBA-PC), ethylene(bistetrabromophthal)imide (EBTBPI), ethylenebispentabromodiphenyl, tris(tribromophenoxy)triazine (TTBPTA), bis(dibromopropyl)tetrabromobisphenol A (DBP-TBBA), bis(dibromopropyl)tetrabromobisphenol S (DBP-TBBS), brominated polyphenylene ethers (BrPPE) (such as poly(di)bromophenylene ethers, etc.), brominated polystyrenes (BrPPE) (such as polydibromostyrene, polytribromostyrene, crosslinked brominated polystyrenes, etc.), brominated crosslinked aromatic polymers, brominated epoxy resins, brominated phenoxy resins, brominated styrene-maleic anhydride polymers, tetrabromobisphenol S (TBBS), tris(tribromoneopentyl)phosphate (TTBNPP), polybromotrimethylphenylindan (PBPI) and tris(dibromopropyl)-isocyanurate (TDBPIC).

When considering the choice of a halogen-based flame retardant for incorporation into a thermoplastic material, key requirements include minimal generation of corrosive gases during melt processing of the thermoplastic material, such as during extrusion and molding and the maintenance of the thermoplastic material's flame resistance and mechanical properties. Examples of halogen-based flame retardants that satisfy these requirements include brominated polyphenylene ethers (including poly(di)bromophenylene ether, etc.) and brominated polystyrenes (including polydibromostyrene, polytribromostyrene, crosslinked brominated polystyrene, etc.), with brominated polystyrenes typically being the most preferred.

Halogen-based flame retardants are also historically accompanied by one or more flame retardant synergists. Conventional flame retardant synergists include antimony oxides (such as diantimony trioxide, diantimony tetroxide, diantimony pentoxide and sodium antimonate), tin oxides (such as tin monoxide and tin dioxide), iron oxides (such as iron(II) oxide and γ-iron oxide), zinc oxide and zinc borate.

Due to environmental concerns, non-halogen-based and low-halogen-based flame retardant additives have increasingly become more prevalent in thermoplastics, especially in polyamides. These additives utilize nitrogen- and phosphorus-based chemical mechanisms for achieving the desired degree of flame retardancy.

Conventional phosphorus-based, non-halogen flame retardants include phosphinates, such as calcium dimethylphosphinate, magnesium dimethylphosphinate, aluminum dimethylphosphinate, zinc dimethylphosphinate, calcium ethylmethylphosphinate, magnesium ethylmethylphosphinate, aluminum ethylmethylphosphinate, zinc ethylmethylphosphinate, calcium diethylphosphinate, magnesium diethylphosphinate, aluminum diethylphosphinate, zinc diethylphosphinate, calcium methyl-n-propylphosphinate, magnesium methyl-n-propylphosphinate, aluminum methyl-n-propylphosphinate, zinc methyl-n-propylphosphinate, calcium methylenebis(methylphosphinate), magnesium methylenebis(methylphosphinate), aluminum methylenebis(methylphosphinate), zinc methylenebis(methylphosphinate), calcium phenylene-1,4-bis(methylphosphinate), magnesium phenylene-1,4-bis(methylphosphinate), aluminum phenylene-1,4-bis(methylphosphinate), zinc phenylene-1,4-bis(methylphosphinate), calcium methylphenylphosphinate, magnesium methylphenylphosphinate, aluminum methylphenylphosphinate, zinc methylphenylphosphinate, calcium diphenylphosphinate, magnesium diphenylphosphinate, aluminum diphenylphosphinate and zinc diphenylphosphinate.

Conventional nitrogen-based, non-halogen flame retardants include benzoguanamine, tris(hydroxyethyl)isocyanurate, isocyanurate, allantoin, glycoluril, melamine cyanurate, melamine phosphate, dimelamine phosphate, melamine pyrophosphate, urea cyanurate, melamine polyphosphate, melamine borate, ammonium polyphosphate, melamine ammonium polyphosphate, melamine ammonium pyrophosphate and condensation products of melamine (such as melem, melam, melon and higher condensed compounds).

Heat stabilizers may be employed in polyamide resins. Conventional heat stabilizers include those selected from hindered phenolic stabilizers, phosphite-based stabilizers, hindered amine-based stabilizers, triazine-based stabilizers, sulfur-based stabilizers and copper stabilizers.

Examples of hindered phenolic stabilizers include N,N'-hexane-1,6-diylbis[3-(3,5-di-tert-butyl-4-hydroxyphenylpropionamide)]; pentaerythrityl-tetrakis[3-(3,5-di-tert-butyl-4-hydroxyphenyl)propionate]; N,N'-hexamethylenebis(3,5-di-tert-butyl-4-hydroxy-hydrocinnamamide); triethyleneglycol-bis[3-(3-tert-butyl-5-methyl-4-hydroxyphenyl)propionate]; 3,9-bis{2-[3-(3-tert-butyl-4-hydroxy-5-methylphenyl)propionyloxy]-1,1-dimethylethyl}-2,4,8,10-tetraoxaspiro[5,5]undecane; 3,5-di-tert-butyl-4-hydroxybenzylphosphonate-diethyl ester; 1,3,5-trimethyl-2,4,6-tris(3,5-di-tert-butyl-4-hydroxybenzyl)benzene; and 1,3,5-tris(4-tert-butyl-3-hydroxy-2,6-dimethylbenzyl)isocyanurate.

Examples of phosphite-based stabilizers include trioctyl phosphite; trilauryl phosphite; tridecyl phosphite; octyldiphenyl phosphite; trisisodecyl phosphite; phenyl diisodecyl phosphite; phenyl di(tridecyl)phosphite; diphenyl isooctyl phosphite; diphenyl isodecyl phosphite; diphenyl(tridecyl) phosphite; triphenyl phosphite; tris(nonylphenyl)phosphite; tris(2,4-di-tert-butylphenyl)phosphite; tris(2,4-di-tert-butyl-5-methylphenyl)phosphite; tris(butoxyethyl)phosphite; 4,4'-butylidene-bis(3-methyl-6-tert-butylphenyl-tetra-tridecyl) diphosphite; tetra($C_{12}$- to $C_{15}$-mixed alkyl)-4,4'-isopropylidenediphenyl diphosphite; 4,4'-isopropylidenebis(2-tert-butylphenyl)-di(nonylphenyl)phosphite; tris(biphenyl)phosphite; tetra(tridecyl)-1,1,3-tris(2-methyl-5-tert-butyl-4-hydroxyphenyl)butane diphosphite; tetra(tridecyl)-4,4'-butylidenebis(3-methyl-6-tert-butylphenyl)diphosphite; tetra($C_1$- to $C_{15}$-mixed alkyl)-4,4'-isopropylidenediphenyl diphosphite; tris(mono-/di-mixed nonylphenyl)phosphite; 4,4'-isopropylidenebis(2-tert-butylphenyl)-di(nonylphenyl) phosphite; 9,10-di-hydro-9-oxa-10-phosphorphenanthrene-10-oxide; tris(3,5-di-t-butyl-4-hydroxyphenyl)phosphite; hydrogenated-4,4'-isopropylidenediphenyl polyphosphite; bis(octylphenyl)-bis(4,4'-butylidenebis(3-methyl-6-tert-butylphenyl)-1,6-hexanol diphosphite; hexa(tridecyl)-1,1,3-tris(2-methyl-4-hydroxy-5-tert-butylphenyl)butane triphosphite; tris(4,4'-isopropylidenebis(2-tert-butylphenyl)phosphite; tris(1,3-stearoyloxyisopropyl)phosphite; 2,2-methylenebis(4,6-di-tert-butylphenyl)octyl phosphite; 2,2-methylenebis(3-methyl-4,6-di-tert-butylphenyl)-2-ethylhexyl phosphite; tetrakis(2,4-di-tert-butyl-5-methylphenyl)-4,4'-biphenylene diphosphite; and tetrakis(2,4-di-tert-butylphenyl)-4,4'-biphenylene diphosphite.

Conventional phosphite-based stabilizers also include pentaerythritol-type phosphite compounds, such as 2,6-di-tert-butyl-4-methylphenyl-phenyl-pentaerythritol diphosphite; 2,6-di-tert-butyl-4-methylphenyl-methyl-pentaerythritol diphosphite; 2,6-di-tert-butyl-4-methylphenyl-2-ethylhexyl-pentaerythritol diphosphite; 2,6-di-tert-butyl-4-methylphenyl-isodecyl-pentaerythritol diphosphite; 2,6-di-tert-butyl-4-methylphenyl-lauryl-pentaerythritol diphosphite; 2,6-di-tert-butyl-4-methylphenyl-isotridecyl-pentaerythritol diphosphite; 2,6-di-tert-butyl-4-methylphenyl-stearyl-pentaerythritol diphosphite; 2,6-di-tert-butyl-4-methylphenyl-cyclohexyl-pentaerythritol diphosphite; 2,6-di-tert-butyl-4-methylphenyl-benzyl-pentaerythritol diphosphite; 2,6-di-tert-butyl-4-methylphenyl-ethylcellosolve-pentaerythritol diphosphite; 2,6-di-tert-butyl-4-methylphenyl-butylcarbitol-pentaerythritol diphosphite; 2,6-di-tert-butyl-4-methylphenyl-octylphenyl-pentaerythritol diphosphite; 2,6-di-tert-butyl-4-methylphenyl-nonylphenyl-pentaerythritol diphosphite; bis(2,6-di-tert-butyl-4-methylphenyl)pentaerythritol diphosphite; bis(2,6-di-tert-butyl-4-ethylphenyl)pentaerythritol diphosphite; 2,6-di-tert-butyl-4-methylphenyl-2,6-di-tert-butylphenyl-pentaerythritol diphosphite; 2,6-di-tert-butyl-4-methylphenyl-2,4-di-tert-butylphenyl-pentaerythritol diphosphite; 2,6-di-tert-butyl-4-methylphenyl-2,4-di-tert-octylphenyl-pentaerythritol diphosphite; 2,6-di-tert-butyl-4-methylphenyl-2-cyclohexylphenyl-pentaerythritol diphosphite; 2,6-di-tert-amyl-4-methylphenyl-phenyl-pentaerythritol diphosphite; bis(2,6-di-tert-amyl-4-methylphenyl)pentaerythritol diphosphite; and bis(2,6-di-tert-octyl-4-methylphenyl)pentaerythritol diphosphite.

Examples of hindered amine-based stabilizers include 4-acetoxy-2,2,6,6-tetramethylpiperidine; 4-stearoyloxy-2,2,6,6-tetramethylpiperidine; 4-acryloyloxy-2,2,6,6-tetramethylpiperidine; 4-(phenylacetoxy)-2,2,6,6-tetramethylpiperidine; 4-benzoyloxy-2,2,6,6-tetramethylpiperidine; 4-methoxy-2,2,6,6-tetramethylpiperidine; 4-stearyloxy-2,2,6,6-tetramethylpiperidine; 4-cyclohexyloxy-2,2,6,6-tetramethylpiperidine; 4-benzyloxy-2,2,6,6-tetramethylpiperidine; 4-phenoxy-2,2,6,6-tetramethylpiperidine; 4-(ethylcarbamoyloxy)-2,2,6,6-tetramethylpiperidine; 4-(cyclohexylcarbamoyloxy)-2,2,6,6-tetramethylpiperidine; 4-(phenylcarbamoyloxy)-2,2,6,6-tetramethylpiperidine; bis(2,2,6,6-tetramethyl-4-piperidyl)-carbonate; bis(2,2,6,6-tetramethyl-4-piperidyl)-oxalate; bis(2,2,6,6-tetramethyl-4-piperidyl)-malonate; bis(2,2,6,6-tetramethyl-4-piperidyl)-sebacate; bis(2,2,6,6-tetramethyl-4-piperidyl)-adipate; bis(2,2,6,6-tetramethyl-4-piperidyl)-terephthalate; 1,2-bis(2,2,6,6-tetramethyl-4-piperidyloxy)-ethane; $\alpha,\alpha'$-bis(2,2,6,6-tetramethyl-4-piperidyloxy)-p-xylene; bis(2,2,6,6-tetramethyl-4-piperidyl)-tolylene-2,4-dicarbamate; bis(2,2,6,6-tetramethyl-4-piperidyl)-hexamethylene-1,6-dicarbamate; tris(2,2,6,6-tetramethyl-4-piperidyl)-benzene-1,3,5-tricarboxylate; tris(2,2,6,6-tetramethyl-4-piperidyl)-benzene-1,3,4-tricarboxylate; 1-[2-{3-(3,5-di-tert-butyl-4-hydroxyphenyl)propionyloxy}butyl]-4-[3-(3,5-di-tert-butyl-4-hydroxyphenyl)propionyloxy]2,2,6,6-tetramethylpiperidine; and a condensation product of 1,2,3,4-butanetetracarboxylic acid; 1,2,2,6,6-pentamethyl-4-piperidinol; and $\beta,\beta,\beta',\beta'$-tetramethyl-3,9-[2,4,8,10-tetraoxaspiro(5,5)undecane]diethanol.

Examples of conventional triazine-based stabilizers include 2,4,6-tris(2'-hydroxy-4'-octyloxy-phenyl)-1,3,5-triazine; 2-(2'-hydroxy-4'-hexyloxy-phenyl)-4,6-diphenyl-1,3,5-triazine; 2-(2'-hydroxy-4'-octyloxyphenyl)-4,6-bis(2',4-dimethylphenyl)-1,3,5-triazine; 2-(2',4'-dihydroxyphenyl)-4,6-bis(2',4'-dimethylphenyl)-1,3,5-triazine; 2,4-bis(2'-hydroxy-4'-propyloxy-phenyl)-6-(2',4'-dimethylphenyl)-1,3,5-triazine; 2-(2-hydroxy-4-octyloxyphenyl)-4,6-bis(4'-methylphenyl)-1,3,5-triazine; 2-(2'-hydroxy-4'-dodecyloxyphenyl)-4,6-bis(2',4'-dimethylphenyl)-1,3,5-triazine; 2,4,6-tris(2'-hydroxy-4'-isopropyloxyphenyl)-1,3,5-triazine; 2,4,6-tris(2'-hydroxy-4'-n-hexyloxyphenyl)-1,3,5-triazine; and 2,4,6-tris(2'-hydroxy-4'-ethoxycarbonylmethoxyphenyl)-1,3,5-triazine.

Conventional copper stabilizers include copper halides (e.g., chlorides, bromides, iodides), copper acetate, copper propionate, copper benzoate, copper adipate, copper terephthalate, copper isophthalate, copper salicylate, copper nicotinate, copper stearate, and copper complex salts coordinated to a chelating amine such as ethylenediamine and ethylenediaminetetraacetic acid.

In the automotive industry, there is an environmental-driven need to reduce emissions and to increase the efficiency of fuel consumption. One way of achieving these goals is to reduce the overall vehicle weight by substituting metal components with thermoplastic ones. Polyamides provide ideal weight reduction in the engine compartment due to their aforementioned heat resistance, mechanical strength, and overall appearance. Coinciding with vehicle weight reduction is the trend to use turbochargers to improve fuel efficiency which increases the demand for polyamides with even higher heat resistance that can also satisfy the mechanical/structural requirements for this application. Along with targeting higher heat resistance, the automotive industry is utilizing more flame retardant thermoplastics. The polyamide compositions of the present invention were developed in part to address these demands for higher heat resistance and flame retardancy while also achieving the desired overall reduction in weight necessary to succeed in the automotive industry.

The polyamide compositions of the present invention are also highly suitable for use in the electrical/electronic industry where the trend toward integration of electronic components has led to an increasing need for the employment of plastic materials with much greater heat resistance and flame retardancy, particularly for use in connectors, circuit breakers, circuit boards and terminal blocks. Such devices are often required to run continuously in demanding environments under extreme temperatures and voltages.

Another need for high heat resistant polyamide compositions is in surface mounting technology (SMT), where the compositions must withstand the melting point of the lead-free solder and avoid bubbling or blistering during the SMT operation. The ability of the polyamide compositions of the present invention to satisfy both the flammability and electrical requirements while also providing improved heat resistance compared to conventional polyamide compositions distinguishes the polyamide compositions of the present invention and makes them ideally suited for addressing the increasingly challenging demands adopted by the electrical/electronic industry.

SUMMARY OF THE INVENTION

An aspect of the present invention is a low-halogen thermoplastic polyamide composition comprising a polyamide resin; a copper-containing heat stabilizer; and a non-halogen flame retardant, where the polyamide composition exhibits superior heat stability while maintaining excellent electrical properties. In an exemplary embodiment, the polyamide composition has an elemental bromine (Br) content of greater than 900 ppm but less than 1300 ppm. In another exemplary embodiment, the polyamide composition has a maximum elemental bromine (Br) content of 900 ppm. In an exemplary embodiment, the polyamide composition also has a maximum total halogen content of 1500 ppm.

In an exemplary embodiment, the low-halogen thermoplastic polyamide composition comprises: a high flow polyamide resin; a non-halogen, nitrogen-containing flame retardant; and a copper-containing heat stabilizer comprising a copper halide and an organophosphorus compound.

In an exemplary embodiment, the heat stabilizer comprises a second copper-containing compound in addition to the copper halide/organophosphorus compound.

In an exemplary embodiment, the polyamide resin is selected from the group consisting of PA-4,6; PA-6,I; PA-6,T; PA-6,6; PA-6/6,6; and mixtures thereof.

In a particular embodiment, the polyamide resin is PA-6,6.

In an exemplary embodiment, the non-halogen, nitrogen-containing flame retardant is a melamine salt or a melamine complex/adduct.

In a particular embodiment, the melamine salt or a melamine complex/adduct is melamine cyanurate.

In a particular embodiment, the melamine salt or a melamine complex/adduct is melamine polyphosphate.

In an exemplary embodiment, the copper halide of the copper-containing heat stabilizer is a copper(I) halide and the organophosphorus compound is triphenylphosphine.

In an exemplary embodiment, the copper halide of the copper-containing heat stabilizer is a copper(I) halide and the organophosphorus compound is triphenylphosphite.

In a particular embodiment, the copper(I) halide is copper (I) iodide.

In a particular embodiment, the copper halide and the organophosphorus compound form a complex.

In an exemplary embodiment, the thermoplastic polyamide composition further comprises a lubricant/mold release agent.

In an exemplary embodiment, the lubricant/mold release agent is a stearic acid salt.

In a particular embodiment, the stearic acid salt is selected from the group consisting of Al stearate, Zn stearate, Ca stearate and mixtures thereof.

In an exemplary embodiment, the thermoplastic polyamide composition further comprises a colorant.

In a particular embodiment, the colorant is carbon black.

In an exemplary embodiment, the thermoplastic polyamide composition comprises: 50-95% (such as 55-95%, such as 60-95%, such as 65-95%) by weight of the polyamide resin; 1-30% (such as 1-20%, such as 1-15%, such as 1-10%) by weight of a melamine salt or a melamine complex/adduct as the non-halogen, nitrogen-containing flame retardant; 0.01-10% (0.01-8%, such as 0.01-5%, such as 0.01-4%, such as 0.01-3%, such as 0.01-2%, such as 0.1-8%, such as 0.1-5%, such as 0.1-4%, such as 0.1-3%, such as 0.1-2%, such as 1-8%, such as 1-5%, such as 1-4%, such as 1-3%, such as 1-2%) by weight of a copper halide/organophosphorus complex as the heat stabilizer; 0-5% (such as 0.1-5%, such as 0.1-4%, such as 0.1 to 3%, such as 1-5%, such as 1-3%) by weight of a lubricant/mold release agent; and 0-5% (such as 0.1-5%, such as 0.1-4%, such as 0.1 to 3%, such as 1-5%, such as 1-3%) by weight of a colorant. In a particular embodiment, the polyamide resin is PA-6,6. In a particular embodiment, the copper halide/organophosphorus complex is a complex of a copper(I) halide with bis(triphenylphosphine). In a particular embodiment, the melamine salt or melamine complex/adduct is melamine cyanurate or melamine polyphosphate. In an exemplary embodiment, the lubricant/mold release agent is a stearic acid salt. In a particular embodiment, the stearic acid salt is zinc stearate. In a particular embodiment, the colorant is carbon black.

Another aspect of the invention is an article obtained from the thermoplastic polyamide compositions described herein. In an exemplary embodiment, the article is an automotive part or an electric/electronic part.

DETAILED DESCRIPTION OF THE INVENTION

In an exemplary embodiment, the polyamide resin is present in an amount of 50-95%, such as 55-95%, such as 60-95%, such as 65-95% by weight selected from the group consisting of PA-6; PA-6,6; PA-6,10; PA-4,6; PA-11; PA-12; PA-12,12; PA-6,I; PA-6,T; PA-6,T/6,6-copolyamide; PA-6,T/6-copolyamide; PA-6/6,6-copolyamide; PA-6,6/6,T/6,1-copolyamide; PA-6,T/2-MPMDT-copolyamide; PA-9,T; PA-4,6/6-copolyamide; and mixtures and copolyamides of the aforementioned polyamides. In a particular embodiment, the polyamide (A) is selected from the group consisting of PA-4,6; PA-6,I; PA-6,T; PA-6,6; PA-6/6,6; and mixtures or a copolyamide thereof.

In an exemplary embodiment of the present invention, the non-halogen, nitrogen-containing flame retardant is melamine-based, such as a melamine salt or a melamine complex/adduct. In a particular embodiment, the non-halogen, nitrogen-containing flame retardant is 1-30%, such as 1-20%, such as 1-15%, such as 1-10% by weight of melamine cyanurate. Melamine cyanurate is a complex formed from a preferably 1:1 mixture of melamine (Formula (II)) and cyanuric acid or isocyanuric acid (Formulae (IIa) and (IIb), respectively).

Formula (II)

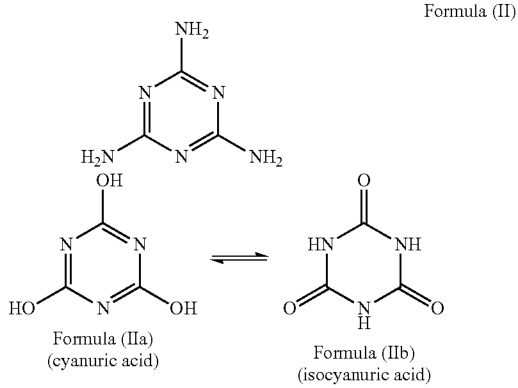

Formula (IIa) (cyanuric acid)

Formula (IIb) (isocyanuric acid)

In an exemplary embodiment, melamine cyanurate is prepared via reaction of aqueous solutions of the compounds of Formula (II) with Formula (IIa) or Formula (IIb) between 90 to 100° C. Melamine cyanurate is also commercially available under several names (such as Melapur® MC25 (BASF), Budit® 315 (Budenheim), JLS-MC25 (Hangzhou JLS Flame Retardants Chemical Co.), Plastisan® B or Plastisan® S (3V)). In an exemplary embodiment, the melamine cyanurate used is Melapur® MC, MC 15, MC 25 or MC 50.

In an exemplary embodiment, melamine polyphosphate is a suitable non-halogen, nitrogen-containing flame retardant. In a particular embodiment, the melamine polyphosphate used in preparing the polyamide compositions of the present invention is commercially available Melapur® 200 (BASF).

Historically, preferred heat stabilizers for polyamides have been copper iodide (alone or typically in combination with potassium iodide) or copper acetate because of their excellent resistance to heat aging. However, due to their significant negative effect on electrical properties such as dielectric strength, surface and volume resistivity, and comparative tracking index (CTI), these copper salts are not typically used in electrical/electronic applications. Further, copper salts such as copper iodide undesirably add color to the compositions in which they are present. In an exemplary embodiment of the present invention, the heat stabilizer is a copper halide in combination with an organophosphorus compound such as, for example, triphenylphosphine or triphenylphosphite. In a particular embodiment, the heat stabilizer is a copper halide complexed with triphenylphosphine or triphenylphosphite. In a particular embodiment, the heat stabilizer is copper iodide complexed with triphenylphosphine or triphenylphosphite. In a particular embodiment, the heat stabilizer is a copper iodide/bis(triphenylphosphine) complex. In a particular embodiment, the copper iodide/bis(triphenylphosphine) complex is BRUGGOLEN® H3386 (available from Brüggemann Chemical). These copper halide and organophosphorus compound combinations, when added to the polyamides described herein, unexpectedly result in polyamide compositions that exhibit superior heat stability while also maintaining excellent electrical properties, thus making the polyamide compositions of the present invention ideally suited for use in the electrical/electronic industries. As a further benefit, this combination of a copper halide and an organophosphorus compound does not discolor the polyamide composition.

In an exemplary embodiment, the amount of the copper stabilizer present in the polyamide compositions of the invention ranges from approximately 0.01 to 10% by weight, such as from 0.01-10%, such as 0.01-8%, such as 0.01-5%, such as 0.01-4%, such as 0.01-3%, such as 0.01-2%, such as 0.1-8%, such as 0.1-5%, such as 0.1-4%, such as 0.1-3%, such as 0.1-2%, such as 1-8%, such as 1-5%, such as 1-4%, such as 1-3%, such as 1-2%, such as 0.03 to 2.5% by weight, such as from 0.03 to 2.3%, such as from 0.03 to 2.0%, such as from 0.03 to 1.7%, such as from 0.03 to 1.5%, such as 0.03 to 1.2%, such as 0.03 to 1.0%, such as 0.03 to 0.8%, such as 0.03 to 0.5%, such as 0.03 to 0.1%, such as 0.03 to 0.08%, such as 0.04 to 3%, such as from 0.04 to 2.5%, such as from 0.04 to 2.3%, such as from 0.04 to 2.0%, such as from 0.04 to 1.7%, such as from 0.04 to 1.5%, such as 0.04 to 1.2%, such as 0.04 to 1.0%, such as 0.04 to 0.8%, such as 0.04 to 0.5%, such as 0.04 to 0.1%, such as 0.04 to 0.08%, such as 0.05 to 3%, such as from 0.05 to 2.5%, such as from 0.05 to 2.3%, such as from 0.05 to 2.0%, such as from 0.05 to 1.7%, such as from 0.05 to 1.5%, such as 0.05 to 1.2%, such as 0.05 to 1.0%, such as 0.05 to 0.8%, such as 0.05 to 0.5%, such as 0.05 to 0.1%, such as 0.05 to 0.08%, such as from 0.07 to 2.5%, such as from 0.07 to 2.3%, such as from 0.07 to 2.0%, such as from 0.07 to 1.7%, such as from 0.07 to 1.5%, such as 0.07 to 1.2%, such as 0.07 to 1.0%, such as 0.07 to 0.8%, such as 0.07 to 0.5%, such as 0.07 to 0.1%, such as from 0.08 to 2.5%, such as from 0.08 to 2.3%, such as from 0.08 to 2.0%, such as from 0.08 to 1.7%, such as from 0.08 to 1.5%, such as 0.08 to 1.2%, such as 0.08 to 1.0%, such as from 0.1 to 2.5%, such as from 0.1 to 2.3%, such as from 0.1 to 2.0%, such as from 0.1 to 1.7%, such as from 0.1 to 1.5%, such as from 0.1 to 1.2%, such as from 0.1 to 1%, such as from 0.15 to 2.5%, such as from 0.15 to 2.3%, such as from 0.15 to 2.0%, such as from 0.15 to 1.7%, such as from 0.15 to 1.5%, such as 0.15 to 1.2%, such as 0.15 to 1.0%, such as 0.25 to 0.75%, such as 0.30 to 0.65% by weight.

In an exemplary embodiment, there is no or a non-significant amount of elemental fluorine (F) or elemental chlorine (Cl) present in the polyamide compositions of the invention and the amount of elemental bromine (Br) that is present is greater than zero but less than 2000 ppm, such as less than 1700 ppm, such as less than 1500 ppm, such as less than 1300 ppm, such as less than 1200 ppm, such as less than 1100 ppm, such as less than 1000 ppm, such as less than 900 ppm, such as less than 800 ppm, such as less than 700 ppm. In a particular embodiment, the amount of elemental bromine present is between 500 and 1500 ppm, such as between 500 and 1200 ppm, such as between 500 and 1000 ppm, such as between 500 and 900 ppm. In an exemplary embodiment, the amount of elemental bromine present is greater than 900 ppm but less than 1300 ppm, or alternatively, at a maximum of 900 ppm. In an exemplary embodiment, the total maximum halogen (elemental fluorine, chlorine and bromine) content in a polyamide composition of the invention is 1500 ppm and is typically determined using UL Halogen test 746H.

The optional lubricant/mold release agent suitable for use in the present invention includes, but is not limited to 0-5%, such as 0.1-5%, such as 0.1-4%, such as 0.1 to 3%, such as 1-5%, such as 1-3% long-chain fatty acids (e.g., stearic acid or behenic acid), their salts (e.g., Ca stearate or Zn stearate) or their ester or amide derivatives (e.g., ethylenebisstearylamide (Acrawax®), montan waxes (mixtures composed of straight-chain, saturated carboxylic acids having chain lengths of from 28 to 32 carbon atoms) or low-molecular-weight polyethylene waxes or low-molecular-weight polypropylene waxes. In an exemplary embodiment, the lubricant and/or mold-release agent is the salt of stearic acid, such as Al stearate, Zn stearate, or Ca stearate.

If desired, one or more colorants may also be added to the polyamide compositions of the present invention in an amount of 0-5%, such as 0.1-5%, such as 0.1-4%, such as 0.1 to 3%, such as 1-5%, such as 1-3% by weight to meet the aesthetic requirements of the final application. Examples of suitable colorants include those commonly used in polyamides, such as, but not limited to, inorganic pigments (such as titanium dioxide, ultramarine blue, iron oxide, zinc sulphide and carbon black), and also organic pigments (such as phthalocyanines, quinacridones and perylenes) and dyes (such as nigrosine and anthraquinones). In an exemplary embodiment, the colorant is carbon black.

EXAMPLES

Example 1

General Preparation of a Polyamide Composition of the Invention

The heat stabilizer, the lubricant/mold release agent, and the colorant were blended together in a drum tumbler, followed by mixing with the primary polyamide feedstock at the feed throat of a ZSK 40 mm twin screw extruder. The non-halogen, nitrogen-containing flame retardant was added via a side feeder and the extruder barrel temperatures ranged from 220-285° C., with a screw speed of 400 rpm, and a throughput of 100 kg/hr.

Molded articles for the determination of mechanical and thermal material properties were produced on a VanDorn 50-ton injection molding machine with cylinder temperatures of 250-285° C. (from hopper to nozzle) and a mold temperature of 95° C.

The following internationally recognized standardized tests were employed for measuring various properties of the polyamide compositions of the invention and the articles prepared therefrom.

Tensile properties, stress, strain, and modulus were measured according to ISO 527-2.

Flexural properties, strength and modulus were measured according to ISO 178.

Charpy Notched Impact Strength at −30° C. and +23° C. was measured according to ISO 179/1eA.

Charpy Unnotched Impact Strength at −30° C. and +23° C. was measured according to ISO 179/1eU.

Izod Notched Impact Strength at +23° C. was measured according to ISO 180.

Heat Deflection Temperature with an applied load of 1.80 MPa was performed according to ISO 75-2/A.

Heat Deflection Temperature with an applied load of 0.45 MPa was performed according to ISO 75-2/B.

Polyamide composition melting points were determined according to ISO 11357-3.

Relative Viscosity values were measured according to ASTM D789.

Melt flow rate which measures the rate of extrusion of thermoplastics through an orifice at a prescribed temperature and load was determined according to ISO 1133.

Flammability testing was conducted on samples at various thicknesses (0.4, 0.75, 1.5, and 3.0 mm) according to the UL94 standard.

Glow Wire Flammability Index (GWFI) was performed on samples at various thicknesses (0.4, 0.75, 1.5, and 3.0 mm) according to IEC 60695-2-12.

Glow Wire Ignition Temperature (GWIT) was performed on samples at various thicknesses (0.4, 0.75, 1.5, and 3.0 mm) according to IEC 60695-2-13.

Volume Resistivity was measured according to IEC 60093.

Dielectric Strength was measured according to IEC 60243.

Arc Resistance was measured according to ASTM D495.

Comparative Tracking Index (CTI) was measured according to both IEC 60112 and ASTM D3638.

High Amp Arc Ignition (HAI) was performed on samples at various thicknesses (0.4, 0.75, 1.5, and 3.0 mm) according to UL 746.

Hot Wire Ignition (HWI) was performed on samples at various thicknesses (0.4, 0.75, 1.5, and 3.0 mm) according to UL 746.

High Voltage Arc Tracking Rate (HVTR) was measured according to UL 746.

Relative Thermal Index (RTI) values were obtained at various thicknesses (0.4, 0.75, 1.5, and 3.0 mm) for Electrical, Impact, and Strength criteria according to UL 746.

Table 1 lists the results of standard test methods on an exemplary polyamide composition of the invention where the polyamide resin was PA-6,6 (91.4 wt %); the flame retardant was melamine cyanurate (8.0 wt %); the heat stabilizer was a Cu(I) iodide-bis(triphenylphosphine) complex (0.5 wt %); and the lubricant/mold release agent was Zn stearate (0.1 wt %) (hereinafter referred to as Example 1).

TABLE 1

| Physical Property of Example 1 Tested | Value | Unit | Test Method |
|---|---|---|---|
| Relative Viscosity | 36 | | ASTM D789 |
| Mechanical Property | | | |
| Tensile Modulus (23° C.) | 3300 | MPa | ISO 527-2 |
| Tensile Stress (Yield, 23° C.) | 83 | MPa | ISO 527-2 |
| Tensile Stress (Break, 23° C.) | 83 | MPa | ISO 527-2 |
| Tensile Strain (Yield, 23° C.) | 4 | % | ISO 527-2 |
| Tensile Strain (Break, 23° C.) | 6 | % | ISO 527-2 |
| Flexural Modulus (23° C.) | 3900 | MPa | ISO 178 |
| Flexural Strength (23° C.) | 107 | MPa | ISO 178 |
| Impact Property | | | |
| Charpy Notched Impact Strength (−30° C.) | 3.7 | kJ/m2 | ISO 179/1eA |
| Charpy Notched Impact Strength (23° C.) | 3.4 | kJ/m2 | ISO 179/1eA |
| Charpy Unnotched Impact Strength (−30° C.) | 78 | kJ/m2 | ISO 179/1eU |
| Charpy Unnotched Impact Strength (23° C.) | 75 | kJ/m2 | ISO 179/1eU |
| Notched Izod Impact Strength (23° C.) | 6 | kJ/m2 | ISO 180 |
| Thermal Property | | | |
| Heat Deflection Temperature (0.45 MPa, Unannealed) | 240 | ° C. | ISO 75-2/B |
| Heat Deflection Temperature (1.8 MPa, Unannealed) | 75 | ° C. | ISO 75-2/A |
| Melting Temperature | 265 | ° C. | ISO 11357-3 |
| RTI Elec (0.400 mm) | 150 | ° C. | UL 746 |
| RTI Elec (0.750 mm) | 150 | ° C. | UL 746 |
| RTI Elec (1.50 mm) | 150 | ° C. | UL 746 |
| RTI Elec (3.00 mm) | 150 | ° C. | UL 746 |
| RTI Imp (0.400 mm) | 110 | ° C. | UL 746 |
| RTI Imp (0.750 mm) | 110 | ° C. | UL 746 |
| RTI Imp (1.50 mm) | 110 | ° C. | UL 746 |
| RTI Imp (3.00 mm) | 110 | ° C. | UL 746 |
| RTI Str (0.400 mm) | 130 | ° C. | UL 746 |
| RTI Str (0.750 mm) | 130 | ° C. | UL 746 |
| RTI Str (1.50 mm) | 130 | ° C. | UL 746 |
| RTI Str (3.00 mm) | 130 | ° C. | UL 746 |

TABLE 1-continued

| Physical Property of Example 1 Tested | Value | Unit | Test Method |
|---|---|---|---|
| Electrical Property | | | |
| Volume Resistivity (0.750 mm) | 1.00E+19 | ohm · cm | IEC 60093 |
| Dielectric Strength (1.00 mm) | 20 | kV/mm | IEC 60243 |
| Arc Resistance (3.00 mm) | 5 | PLC | ASTM D495 |
| Comparative Tracking Index (3.00 mm) | 600 | V | IEC 60112 |
| Comparative Tracking Index (3.00 mm) | 0 | PLC | ASTM D3638 |
| High Amp Arc Ignition (HAI) (0.400 mm) | 0 | PLC | UL 746 |
| High Amp Arc Ignition (0.750 mm) | 0 | PLC | UL 746 |
| High Amp Arc Ignition (1.50 mm) | 0 | PLC | UL 746 |
| High Amp Arc Ignition (3.00 mm) | 0 | PLC | UL 746 |
| High Voltage Arc Tracking Rate (HVTR) | 0 | PLC | UL 746 |
| Hot-wire Ignition (HWI) (0.400 mm) | 4 | PLC | UL 746 |
| Hot-wire Ignition (0.750 mm) | 3 | PLC | UL 746 |
| Hot-wire Ignition (1.50 mm) | 3 | PLC | UL 746 |
| Hot-wire Ignition (3.00 mm) | 1 | PLC | UL 746 |
| Flammability Property | | | |
| Flammability (UL Rating) (0.200 mm) | V-0 | | UL 94 |
| Flammability (UL Rating) (0.400 mm) | V-0 | | UL 94 |

TABLE 1-continued

| Physical Property of Example 1 Tested | Value | Unit | Test Method |
|---|---|---|---|
| Flammability (UL Rating) (0.750 mm) | V-0 | | UL 94 |
| Flammability (UL Rating) (1.50 mm) | V-0 | | UL 94 |
| Flammability (UL Rating) (3.00 mm) | V-0 | | UL 94 |
| Glow Wire Flammability Index (0.400 mm) | 960 | ° C. | IEC 60695-2-12 |
| Glow Wire Flammability Index (0.750 mm) | 960 | ° C. | IEC 60695-2-12 |
| Glow Wire Flammability Index (1.50 mm) | 960 | ° C. | IEC 60695-2-12 |
| Glow Wire Flammability Index (3.00 mm) | 960 | ° C. | IEC 60695-2-12 |
| Glow Wire Ignition Temperature (0.400 mm) | 960 | ° C. | IEC 60695-2-13 |
| Glow Wire Ignition Temperature (0.750 mm) | 960 | ° C. | IEC 60695-2-13 |
| Glow Wire Ignition Temperature (1.50 mm) | 800 | ° C. | IEC 60695-2-13 |
| Glow Wire Ignition Temperature (3.00 mm) | 775 | ° C. | IEC 60695-2-13 |

Tables 2 and 3 list exemplary polyamide compositions of the invention (Table 2) as well as exemplary comparative examples (Table 3). Table 4 lists selected tested properties of the compositions of Table 2 and Table 5 lists selected tested properties of the comparative compositions of Table 3.

TABLE 2

| Additive | Ex 2 | Ex 3 | Ex 4 | Ex 5 | Ex 6 | Ex 7 | Ex 8 | Ex 9 | Ex 10 |
|---|---|---|---|---|---|---|---|---|---|
| A | | | | | | | | | 90.4 |
| B | 81.4 | 80.9 | 81.4 | 91.4 | 91.6 | 91.4 | 92.4 | 92.4 | |
| C | 1.00 | 1.00 | 1.00 | 1.00 | 1.00 | 1.00 | | | 1.00 |
| D | | | | | | | | | |
| E | 0.1 | 0.1 | | 0.1 | | | | | |
| F | | | 0.1 | | 0.1 | 0.1 | 0.1 | 0.1 | 0.1 |
| G | | | | | | | | | |
| H | | | | | | | | | |
| I | 7.00 | 7.50 | 7.00 | 7.00 | 7.00 | 7.00 | 7.00 | 7.00 | 8.00 |
| J | 10.00 | 10.00 | 10.00 | | | | | | |
| K | | | | | | | | | |
| L | 0.5 | 0.5 | 0.5 | 0.5 | 0.3 | 0.5 | 0.5 | 0.5 | 0.5 |
| TOTAL (wt %) | 100 | 100 | 100 | 100 | 100 | 100 | 100 | 100 | 100 |
| Cu (ppm) | | | | | 70 | 133 | 145 | 170 | 135 |
| Br (ppm) | | | | | 636 | 1080 | 1100 | 1300 | 1165 |

A = PA66, low viscosity;
B = PA66, high viscosity;
C = PA66, fine powder to assist compounding;
D = aluminum stearate (lubricant);
E = calcium stearate (lubricant);
F = zinc stearate (lubricant);
G = Acrawax ® (lubricant);
H = titanium dioxide (colorant);
I = melamine cyanuarate (non-halogen, nitrogen-containing flame retardant);
J = Nylon 6 (PA6);
K = phenolic organic heat stabilizer;
L = copper heat stabilizer

TABLE 3

| Additive | Comp Ex 1 | Comp Ex 2 | Comp Ex 3 | Comp Ex 4 |
|---|---|---|---|---|
| A | 90.2 | | | |
| B | | 90.8 | 90.8 | 90.3 |
| C | 1.00 | 1.00 | 1.00 | 1.00 |
| D | 0.1 | | | |
| E | | | | |
| F | | 0.1 | 0.1 | 0.1 |
| G | 0.25 | | | |
| H | 0.1 | | | |
| I | 8.00 | 7.00 | 7.00 | 7.00 |
| J | | | | |
| K | 0.4 | 0.5 | | 0.5 |
| L | | | | |
| M | | | 0.5 | 0.5 |
| N | | 0.5 | 0.5 | 0.5 |
| O | | 0.1 | 0.1 | 0.1 |
| TOTAL (wt %) | 100 | 100 | 100 | 100 |

A = PA66, low viscosity;
B = PA66, high viscosity;
C = PA66, fine powder to assist compounding;
D = aluminum stearate (lubricant);
E = calcium stearate (lubricant);
F = zinc stearate (lubricant);
G = Acrawax ® (lubricant);
H = titanium dioxide (colorant);
I = melamine cyanuarate (non-halogen, nitrogen-containing flame retardant);
J = Nylon 6 (PA6);
K = phenolic organic heat stabilizer;
L = copper heat stabilizer;
M = hindered amine organic heat stabilizer;
N = thioester organic heat stabilizer;
O = phosphite organic heat stabilizer

TABLE 4

| Property | Ex 2 | Ex 3 | Ex 4 | Ex 5 | Ex 6 | Ex 7 | Ex 8 | Ex 9 | Ex 10 |
|---|---|---|---|---|---|---|---|---|---|
| UL94 (3 mm) | | | | | | | V-0 | V-2 | V-0 |
| UL94 (1.5 mm) | | | | | | | V-0 | V-2 | V-0 |
| UL94 (0.75 mm) | | | | | | | V-0 | V-2 | V-0 |
| UL94 (0.4 mm) | V-0 | V-0 | V-0 | V-0 | | | V-0 | V-2 | V-0 |
| Tensile Strength (MPa) | 86.9 | 85.7 | 89 | 89.3 | 85.8 | 91.3 | 85 | 90 | 89.5 |
| Tensile Modulus (MPa) | | | | | | | | 3279 | 3405 |
| Elongation at Break (%) | 4.2 | 4 | 7.4 | 4.2 | | | 3.9 | 6.9 | 5.1 |
| Flexural Strength (MPa) | | | | | | | | 101 | 110 |
| Flexural Modulus (MPa) | | | | | | | | 3296 | 3826 |
| Notched Charpy ($kJ/m^2$) | | | | | | | | 2.7 | |
| Notched Izod ($kJ/m^2$) | | | | | | | | | 1.6 |
| Density ($g/cm^3$) | | | | | | | | | 1.16 |
| GWIT (° C.) | | | | | | | | | 960 |

TABLE 5

| Property | Comp Ex 1 | Comp Ex 2 | Comp Ex 3 | Comp Ex 4 |
|---|---|---|---|---|
| UL94 (3 mm) | | | | |
| UL94 (1.5 mm) | | | | |
| UL94 (0.75 mm) | V-0 | | | |
| UL94 (0.4 mm) | V-0 | V-2 | V-2 | V-2 |
| RV | 53 | | | |
| Tensile Strength (MPa) | 88.4 | 90.6 | 90.4 | 92.6 |
| Tensile Modulus (MPa) | | | | |
| Elongation at Break (%) | 4.4 | 6.8 | 8.3 | 8.2 |

Table 6 lists several commercial (conventional) polyamide compositions that were tested against an exemplary composition of the present invention (Example 1 in the table). Table 7 compares selected electrical properties of these compositions and Table 8 compares their elongation/impact properties.

TABLE 6

| | Trademark | Grade Code | Material Type/Feature |
|---|---|---|---|
| Example 1 | | ECO366 | NHFR-PA66, unfilled, heat stabilized |
| Conventional 1 | Vydyne | ECO366H | NHFR-PA66, unfilled, heat stabilized |
| Conventional 2 | Schulamid | 66 MV 5 FR | NHFR-PA66, unfilled |
| Conventional 3 | Leona | FR370 | NHFR-PA66, unfilled |
| Conventional 4 | Leona | FR561 | NHFR-PA66, unfilled |
| Conventional 5 | Ultramid | A3U30 | NHFR-PA66, unfilled |
| Conventional 6 | Novamid | 3010N-5-SL4-3X | NHFR-PA66, unfilled |
| Conventional 7 | Zytel | FR15 | NHFR-PA66, unfilled, high flow |
| Conventional 8 | Zytel | FR7025V0F | NHFR-PA66, unfilled, FR(30) |
| Conventional 9 | Zytel | FR7026V0F | NHFR-PA66, unfilled, heat stabilized, FR(30) |
| Conventional 10 | Grilon | AS V0 | NHFR-PA66, unfilled |
| Conventional 11 | Kopa | KN3322V0 | NHFR-PA66, unfilled |
| Conventional 12 | Durethan | A30SFN31 | NHFR-PA66, unfilled |
| Conventional 13 | Latamid | 66 H-V0 | NHFR-PA66, unfilled |
| Conventional 14 | Lumid | GN-1001BF | NHFR-PA66, unfilled |
| Conventional 15 | Frianyl | A2 V0 | NHFR-PA66, unfilled, high flow |
| | Frianyl | A63NV0 | |
| Conventional 16 | Frianyl | A3 V0 | NHFR-PA66, unfilled |
| | Frianyl | A63V0 | |
| Conventional 17 | Frianyl | A3 RV0 | NHFR-PA66, unfilled, heat stabilized |
| | Frianyl | A63RV0 | |
| Conventional 18 | Radiflam | A FR | NHFR-PA66, unfilled |
| Conventional 19 | Torzen Marathon | FRU4800 XHL | NHFR-PA66, unfilled, heat stabilized |
| Conventional 20 | Technyl | A50H1 | NHFR-PA66, unfilled, heat stabilized |
| Conventional 21 | Amilan | CM3004-V0 | NHFR-PA66, unfilled |
| Conventional 22 | Vampamid | 66 0024V0 | NHFR-PA66, unfilled |

TABLE 7

| | Thickness | RTI [Elec/Imp/Str] | Dielectric Strength (kV/mm) | Volume Resistivity ($10^x$ Ω-cm) | Flame Class | GWIT (° C.) |
|---|---|---|---|---|---|---|
| Example 1 | 0.20 mm | | 20 | 19 | V-0 | |
| | 0.40 mm | [150/110/130] | | | V-0 | 960 |
| | 0.75 mm | [150/110/130] | | | V-0 | 960 |
| | 1.5 mm | [150/110/130] | | | V-0 | 800 |
| | 3.0 mm | [150/110/130] | | | V-0 | 775 |
| Conventional 1 | 0.40 mm | [120/75/105] | 17 | 10 | V-0 | 960 |
| | 0.75 mm | [120/80/110] | | | V-0 | 960 |
| | 1.5 mm | [120/80/110] | | | V-0 | 700 |
| | 3.0 mm | [120/80/110] | | | V-0 | 700 |
| Conventional 2 | 0.20 mm | [65/65/65] | 16 | 11 | HB | 960 |
| | 0.40 mm | [65/65/65] | | | V-0 | 960 |
| | 0.75 mm | [65/65/65] | | | V-0 | 960 |
| | 1.5 mm | [65/65/65] | | | V-0 | 960 |
| | 3.0 mm | [65/65/65] | | | V-0 | 960 |
| Conventional 3 | 0.38 mm | [95/65/95] | 31 | 15 | V-0 | |
| | 0.75 mm | [130/90/105] | | | V-0 | |
| | 1.5 mm | [130/105/105] | | | V-0 | |
| | 3.0 mm | [130/105/105] | | | V-0 | |
| Conventional 4 | 0.75 mm | [130/90/105] | | | V-0 | |
| | 1.5 mm | [130/105/105] | | | V-0 | |
| | 3.0 mm | [130/105/105] | | | V-0 | |
| Conventional 5 | 0.25 mm | | 25 | 13 | V-0 | |
| | 0.40 mm | | | | V-0 | |
| | 0.75 mm | [130/90/120] | | | V-0 | |
| | 1.5 mm | [130/90/120] | | | V-0 | |
| | 3.0 mm | [130/90/120] | | | V-0 | |
| Conventional 6 | 0.40 mm | | 23 | 13 | V-0 | |
| | 0.75 mm | [130/105/120] | | | V-0 | |
| | 1.5 mm | [130/105/120] | | | V-0 | |
| | 3.0 mm | [130/105/120] | | | V-0 | |
| Conventional 7 | 0.75 mm | [130/75/85] | 22 | 14 | V-0 | 725 |
| | 1.5 mm | [130/75/85] | | | V-0 | 725 |
| | 3.0 mm | [130/75/85] | | | V-0 | 775 |
| Conventional 8 | 0.40 mm | | 18 | 12 | V-0 | 960 |
| | 0.75 mm | [130/75/85] | | | V-0 | 775 |
| | 1.5 mm | [130/75/85] | | | V-0 | 775 |
| | 3.0 mm | [130/75/85] | | | V-0 | 775 |

TABLE 7-continued

| | Thickness | RTI [Elec/Imp/Str] | Dielectric Strength (kV/mm) | Volume Resistivity ($10^x$ Ω-cm) | Flame Class | GWIT (° C.) |
|---|---|---|---|---|---|---|
| Conventional 9 | 0.40 mm | [65/65/65] | 18 | 12 | V-0 | 960 |
| | 0.82 mm | [130/95/110] | | | V-0 | 960 |
| | 1.5 mm | [130/95/110] | | | V-0 | 960 |
| | 3.0 mm | [130/95/110] | | | V-0 | 960 |
| Conventional 10 | 0.75 mm | [115/105/120] | | | V-0 | |
| | 0.85 mm | [115/105/120] | | | V-0 | |
| | 1.5 mm | [115/105/120] | | | V-0 | |
| | 3.0 mm | [115/105/120] | | | V-0 | |
| Conventional 11 | 0.40 mm | | | | V-0 | 960 |
| | 0.75 mm | [105/105/120] | | | V-0 | 960 |
| | 1.5 mm | [105/105/120] | | | V-0 | 960 |
| | 3.0 mm | [105/105/120] | | | V-0 | 750 |
| Conventional 12 | 0.40 mm | [130/105/125] | | | V-0 | 775 |
| | 0.75 mm | [130/105/125] | | | V-0 | 775 |
| | 1.5 mm | [130/105/125] | | | V-0 | 775 |
| | 3.0 mm | [130/105/125] | | | V-0 | 775 |
| Conventional 13 | 0.40 mm | | 14 | 13 | V-0 | |
| | 0.81 mm | [125/75/75] | | | V-0 | |
| | 1.5 mm | [125/75/75] | | | V-0 | |
| | 3.0 mm | [125/80/85] | | | V-0 | |
| Conventional 14 | 0.4 mm | | | | | 960 |
| | 0.75 mm | [65/65/65] | | | V-0 | 850 |
| Conventional 15 | 0.40 mm | [65/65/65] | | | V-0 | |
| Conventional 16 | 0.40 mm | [125/90/115] | | | V-0 | |
| | 0.75 mm | [125/95/115] | | | V-0 | |
| | 1.5 mm | [125/95/120] | | | V-0 | |
| | 3.0 mm | [125/95/120] | | | V-0 | |
| Conventional 17 | 0.25 mm | [65/65/65] | 25 | 13 | V-0 | |
| | 0.40 mm | [130/105/115] | | | V-0 | |
| | 0.75 mm | [130/105/120] | | | V-0 | 775 |
| | 1.5 mm | [130/105/120] | | | V-0 | 775 |
| | 3.0 mm | [130/105/120] | | | V-0 | 775 |
| Conventional 18 | 0.40 mm | [130/90/120] | | | V-0 | 960 |
| | 0.75 mm | [130/100/120] | | | V-0 | 960 |
| | 1.5 mm | [130/100/120] | | | V-0 | 930 |
| | 3.0 mm | [130/100/120] | | | V-0 | 750 |
| Conventional 19 | 0.25 mm | | 21 | 12 | V-0 | |
| | 0.40 mm | [130/95/125] | | | V-0 | 960 |
| | 0.71 mm | [140/110/140] | | | V-0 | 960 |
| | 1.5 mm | [140/110/140] | | | V-0 | 960 |
| | 3.0 mm | [140/110/140] | | | V-0 | 725 |
| Conventional 20 | 0.40 mm | [130/105/120] | | | V-0 | 960 |
| | 0.75 mm | [130/105/120] | | | V-0 | 960 |
| | 1.5 mm | [130/105/120] | | | V-0 | 775 |
| | 3.0 mm | [130/105/120] | | | V-0 | 700 |
| Conventional 21 | 0.25 mm | | 28 | 13 | V-0 | |
| | 0.40 mm | | | | V-0 | |
| | 0.66 mm | [130/105/105] | | | V-0 | |
| | 1.5 mm | [130/105/105] | | | V-0 | |
| | 3.0 mm | [130/105/105] | | | V-0 | |
| Conventional 22 | 0.75 mm | [65/65/65] | | | V-0 | |
| | 1.5 mm | [65/65/65] | | | V-0 | |
| | 3.0 mm | [65/65/65] | | | V-0 | |

TABLE 8

| | Tensile Strength Yield/Break (MPa) | Tensile Elongation Yield/Break (%) | Tensile Modulus (MPa) | Flextural Modulus (MPa) | Notched Charpy Impact 23° C./−30° C. (kj/m$^2$) |
|---|---|---|---|---|---|
| Example 1 | 83/— | —/6 | | 3900 | 3.4/3.7 |
| Conventional 1 | 83/— | —/5 | | 3900 | 3.4/3.7 |
| Conventional 2 | 80/— | 4.9/— | 3600 | 3700 | 5/3 |
| Conventional 3 | 83/— | —/7 | | 3300 | 3/— |
| Conventional 4 | | | | | |
| Conventional 5 | 80/— | —/3 | 3700 | 3600 | 3/— |
| Conventional 6 | 81/— | 4.2/— | 3100 | | 4/— |
| Conventional 7 | 85/— | —/10 | | 3450 | |
| Conventional 8 | 90/80 | 4/10 | 3800 | 3660 | 4/3 |
| Conventional 9 | 89/80 | 4/10 | 3800 | | 4/3 |

TABLE 8-continued

| | Tensile Strength Yield/Break (MPa) | Tensile Elongation Yield/Break (%) | Tensile Modulus (MPa) | Flextural Modulus (MPa) | Notched Charpy Impact 23° C./−30° C. (kj/m$^2$) |
|---|---|---|---|---|---|
| Conventional 10 | 90/80 | 4/9 | 3900 | | 4/— |
| Conventional 11 | —/86 | —/13 | | 3400 | 4.5/— |
| Conventional 12 | 85/— | 4.1/— | 3800 | 3700 | 10/— |
| Conventional 13 | 75/70 | 3/8 | 4200 | 3300 | 3/— |
| Conventional 14 | 79/— | —/30.0 | | 3000 | 4.9/— |
| Conventional 15 | 80/— | —/6.0 | 3500 | | 3.5/3.0 |
| Conventional 16 | 80/— | —/8.0 | 3500 | | 3.5/3.0 |
| Conventional 17 | 85/— | —/12.0 | 3400 | | 3.5/3.0 |
| Conventional 18 | 77/— | —/12.0 | 3450 | 3200 | 4.5/4 |
| Conventional 19 | —/80 | —/13 | 3700 | | 2.4/— |
| Conventional 20 | 86/75 | 4.2/21.0 | 3800 | 3700 | 3.2/— |
| Conventional 21 | 85/— | —/7.5 | | 3500 | 4.5/— |
| Conventional 22 | 70/— | —/15 | 3000 | | |

As evidenced by the results of Tables 7 and 8, the polyamide compositions of the present invention when compared to the conventional art were observed to unexpectedly (i) exhibit best in class Electrical RTI values (150° C. at all thicknesses) for an unfilled PA66 composition; (ii) retain excellent electrical properties, dielectric strength, volume resistivity, comparative tracking index, and high amp arc ignition in the presence of a copper-containing heat stabilizer; (iii) achieve a superior UL94 V0 rating down to a 0.2 mm thickness; (iv) provide high flow to allow the filling of thin-walled parts during injection molding and reduced cavity and injection pressures. In addition, it is highly desirable that a PA-6,6 composition is able to exhibit equivalent or superior electric performance at higher temperatures compared to more expensive conventional PA-4,6; PA-6,I compositions, while maintaining the required mechanical (e.g., elongation/break/impact) properties.

All publications and patents cited herein are incorporated by reference in their entireties.

The invention claimed is:

1. A low-halogen thermoplastic polyamide composition comprising:

a polyamide resin;

a non-halogen flame retardant, wherein the non-halogen flame retardant is a melamine salt or a melamine adduct; and 0.03-2.5% by weight of a copper-containing heat stabilizer comprising a copper halide and an organophosphorus compound, wherein the polyamide composition has an elemental bromine content of greater than 900 ppm but less than 1300 ppm.

2. The thermoplastic polyamide composition according to claim 1, wherein the polyamide resin is selected from the group consisting of PA-4,6; PA-6,I; PA-6,T; PA-6,6; PA-6/6,6; and a mixture thereof.

3. The thermoplastic polyamide composition according to claim 1, wherein the polyamide resin is PA-6,6.

4. The thermoplastic polyamide composition according to claim 1, wherein the melamine salt or a melamine adduct is melamine cyanurate or melamine polyphosphate.

5. The thermoplastic polyamide composition according to claim 1, wherein the copper halide and the organophosphorus compound form a complex.

6. The thermoplastic polyamide composition according to claim 1, wherein the organophosphorus compound is triphenylphosphine or triphenylphosphite.

7. The thermoplastic polyamide composition according to claim 5, wherein the copper halide is copper(I) halide, and wherein the organophosphorus compound is bis(triphenylphosphine) or bis(triphenylphosphite).

8. The thermoplastic polyamide composition according to claim 1, wherein the copper halide is copper(I) iodide.

9. The thermoplastic polyamide composition according to claim 1, further comprising a lubricant or mold release agent.

10. The thermoplastic polyamide composition according to claim 9, wherein the lubricant or mold release agent is a stearic acid salt.

11. The thermoplastic polyamide composition according to claim 1, further comprising a colorant.

12. The thermoplastic polyamide composition according to claim 1, further comprising an additional copper-containing heat stabilizer.

13. A low-halogen thermoplastic polyamide composition comprising:

a polyamide resin;

a non-halogen flame retardant, wherein the non-halogen flame retardant is a melamine salt or a melamine adduct; and 0.03-2.5% by weight of a copper-containing heat stabilizer comprising a copper halide and an organophosphorus compound, wherein the polyamide composition has a maximum elemental bromine content of 900 ppm.

14. The thermoplastic polyamide composition according to claim 1, comprising:

50-95% by weight of the polyamide resin;

1-20% by weight of the melamine salt or the melamine adduct;

0.03-2.5% by weight of the heat stabilizer, wherein the copper halide and the organophosphorus compound form a complex;

0-10% by weight of a lubricant or mold release agent; and 0-10% by weight of a colorant.

15. The thermoplastic polyamide composition according to claim 14, wherein the polyamide resin is PA-6,6; wherein the copper halide is copper(I) halide;

and wherein the organophosphorus compound is bis(triphenylphosphine).

16. The thermoplastic polyamide composition according to claim 14, wherein the melamine salt or melamine adduct is melamine cyanurate or melamine polyphosphate.

17. The thermoplastic polyamide composition according to claim 14, wherein the lubricant/mold release agent is a stearic acid salt.

18. The thermoplastic polyamide composition according to claim 14, wherein the colorant is carbon black.

19. An article obtained from the thermoplastic polyamide composition according to claim 1.

20. The article according to claim 19, where the article is an automotive part.

21. The article according to claim 19, where the article is an electric or electronic part.

22. The thermoplastic polyamide composition according to claim 1, wherein the melamine salt or the melamine adduct is melamine cyanurate.

23. The thermoplastic polyamide composition according to claim 1, comprising 7-20% by weight of the melamine salt or the melamine adduct.

* * * * *